INVENTOR.
J. W. ROBERTS

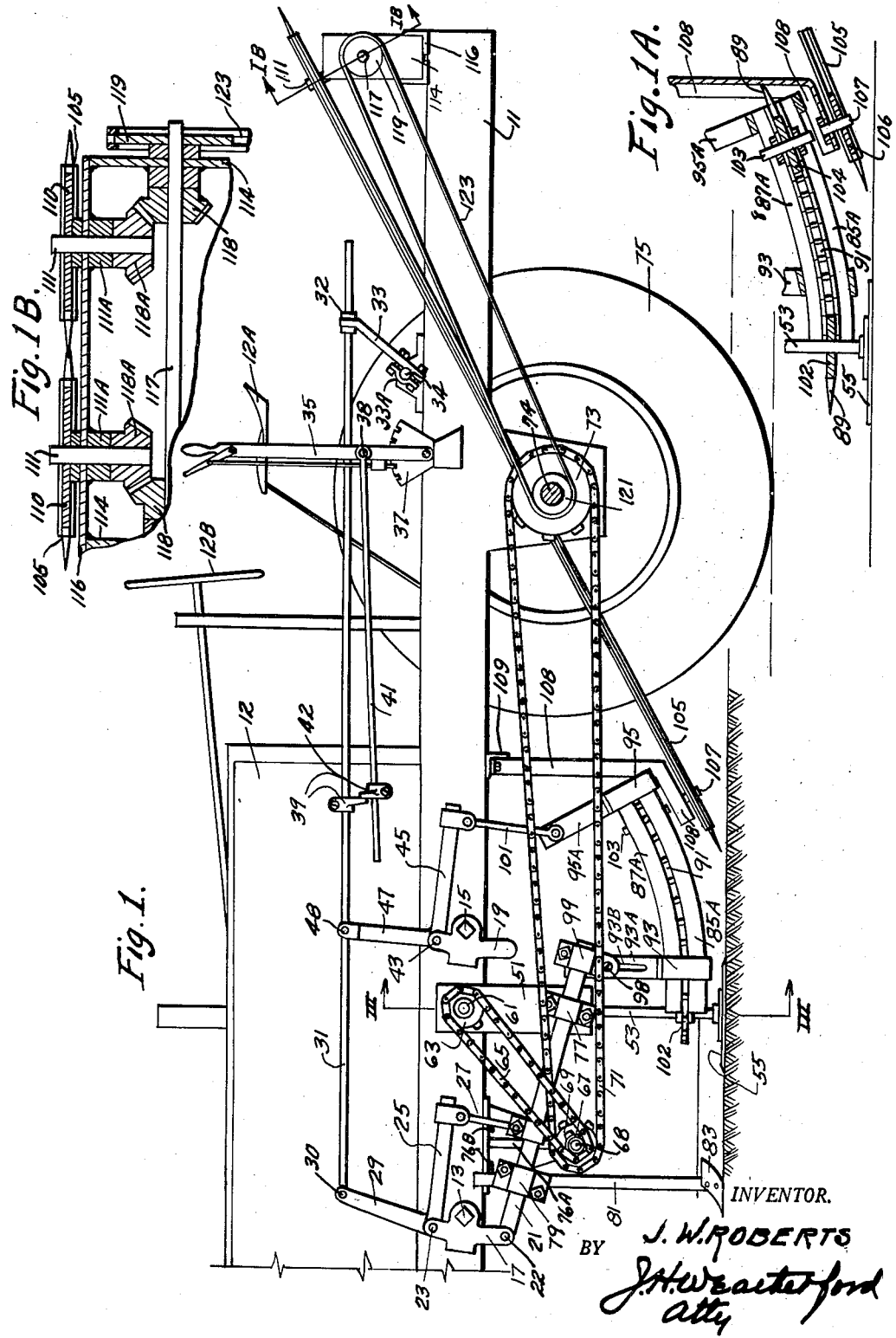

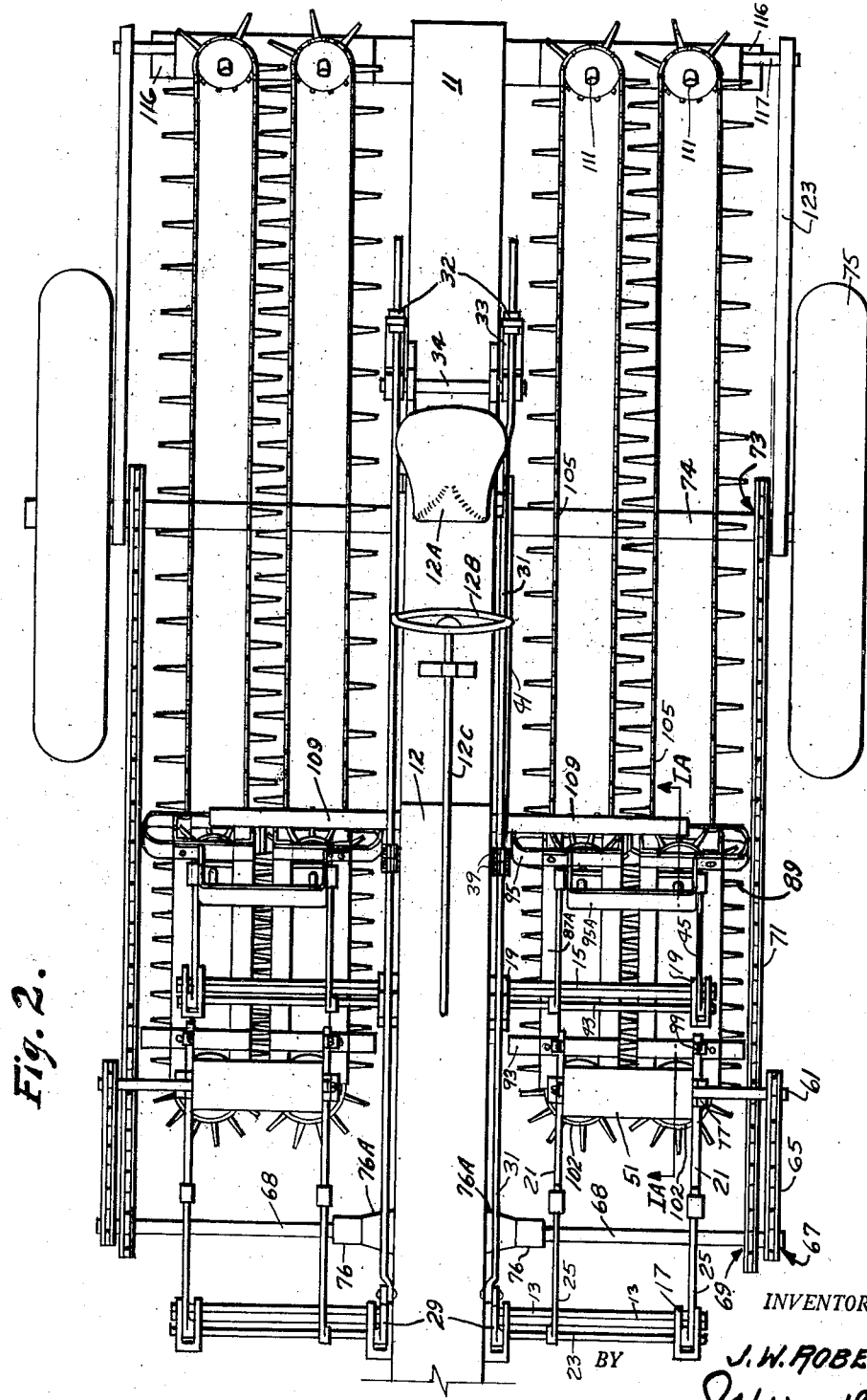

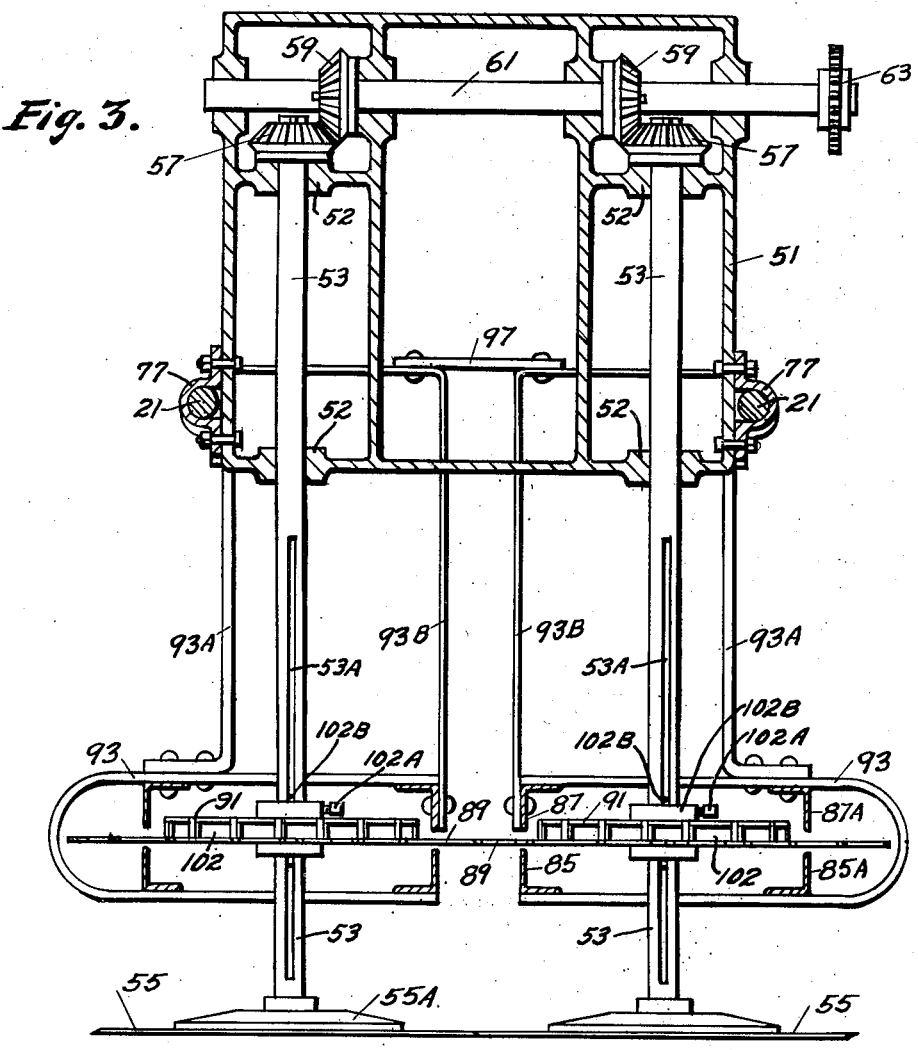
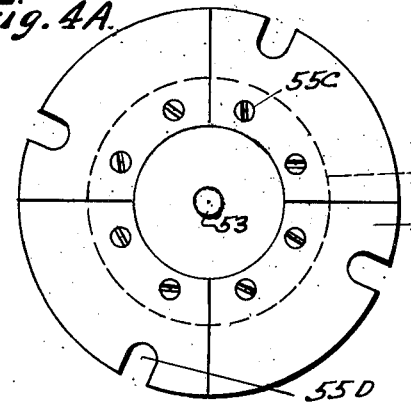
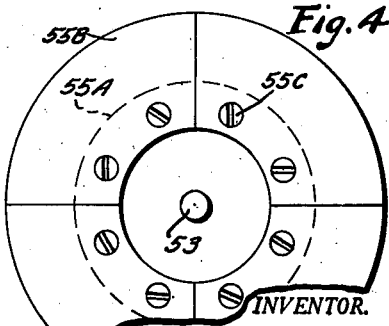

Patented July 4, 1950

2,514,338

UNITED STATES PATENT OFFICE 2,514,338

CULTIVATOR AND HARVESTER

Jackson W. Roberts, Luxora, Ark.

Application July 1, 1946, Serial No. 680,557

4 Claims. (Cl. 55—9)

This invention relates to new and useful improvements in devices for chopping and cleaning out weeds and plants along a row and establishing uniformly spaced row portions or hills in which the plants are left undisturbed. It further relates to devices of this kind which may be used in harvesting the plants in such rows, and it has particular relation to devices which are adapted for attachment to farm tractors, and to be driven and hauled by the operating mechanisms currently a part of many such tractors.

In the cultivation of cotton the seed are usually planted continuously along the row and after the plants have reached the height of a few inches the larger portion are chopped out leaving certain undisturbed plants at substantially uniform spacing. After such chopping the weeds and grass grow again between the hills and a second and third chopping are often necessary. Where chopping is done by machine it has been substantially impossible to register the machine for a second chopping and removal of any subsequent growth of weeds or grass must be hand work.

An object of the invention is:

To provide for such purpose a simple, economical and efficient device for chopping out plants, grass and weeds at regular spaced intervals along a row so that plants may be left standing and others therebetween may be cut off.

A further object is to provide such a device having parts which may be changed to provide initially for thinning plants and weeds subsequently for accomplishing more complete thinning and for accomplishing the desired final chopping.

Certain classes of plants, such as cabbage, lettuce and spinach, form heads entirely above ground, these plants being readily cut off below such heads for harvesting, this ordinarily being done by hand. Other classes, such as celery, form heads which are largely above ground, but must be pulled up rather than cut off, and still others of the bulbous type, such as onions, radishes and many classes of turnips, are of shallow growth and are usually also pulled up by hand in harvesting.

Further objects are:

To provide a device which may also be used in the harvesting of substantially any or all of the above mentioned and other plants;

To provide a device for offbarring or throwing the soil outward on opposite sides of the row to narrow the row in advance of the thinning, chopping or harvesting action, as the case may be, so that more effectual use may be made of the chopping or harvesting mechanism;

To provide a harvesting machine which may be used to top plants, as in the recovery of seed, or cut off the surface type of plant at or above the ground, or to dig in below the shallow growing type of plants and loosen them so that they may be readily gathered up;

To provide a carrier mechanism which will pick up and remove these plants after they have been separated;

To provide a device employing rotary discs which may be adjustably positioned above the row for seed topping to conform to the surface of the row to cut off plants at the surface, or to cut below the surface of the row and dislodge shallow growing plants, and in connection with such discs, means for removing the plants thus cut off if dislodged.

These objects are accomplished by providing a pair of horizontally disposed discs having sharpened shearing edges, which discs are driven to turn at coordinated speed and are provided with registering gaps for leaving plants at uniform intervals for chopping, and particularly to provide a device of this character in which discs without such gaps may be readily substituted for discs having the gaps and the shearing action be made continuous so that all plants may be cut off as the machine is progressed along the row, the discs being so mounted that they may be raised and lowered to cut above the surface of the row, along the surface of the row, or below the surface.

The means by which the foregoing and other objects are accomplished and the manner of their accomplishment will readily be understood from the following specification upon reference to the accompanying drawings, in which:

Fig. 1 is a side elevation of the device as carried by a typical well known type of farm tractor.

Fig. 1A is a fragmentary sectional elevational view taken on the line IA—IA of Fig. 2 showing harvester chains and drive. Fig. 1B is a fragmentary sectional elevation taken on the line IB—IB of Fig. 1, showing the bevel drives for the conveyor chains.

Fig. 2 is a corresponding plan view showing the device in duplicate carried by the tractor.

Fig. 3 is an enlarged scale transverse sectional elevation of one only of the two devices shown in plan, the view being taken on the line III—III of Fig. 1.

Fig. 4 is an inverted plan view showing the smooth edge discs used in harvesting.

Figs. 4A, 5 and 6 are similar views of thinning discs, modified with respect to Fig. 4 to show edge notches.

Figure 7:
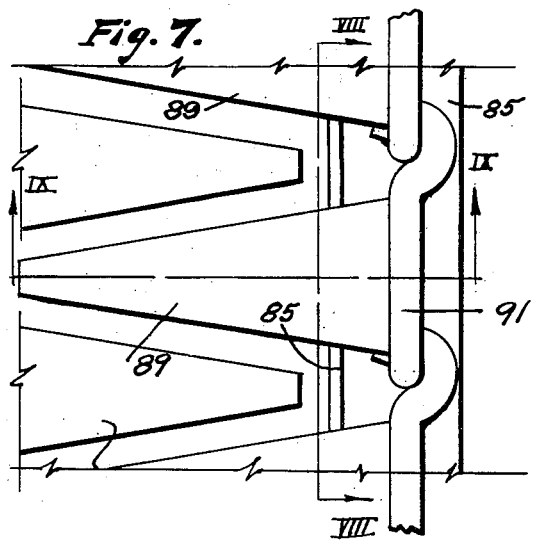
Fig. 7 is a plan view, showing the edge of a link of the carrier chain and fingers carried thereby.
Figure 8:
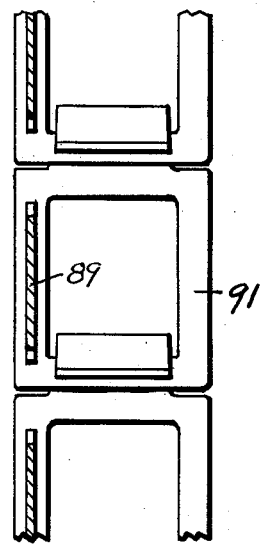
Fig. 8 is a sectional elevation taken on the line VIII—VIII of Fig. 7.
Figure 9:
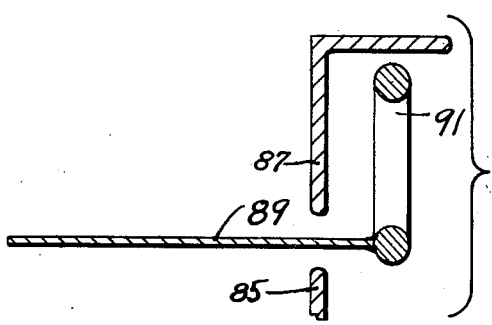

Fig. 9 a sectional elevation taken on the line IX—IX of Fig. 7.

Referring now to the drawings in which the various parts are indicated by numerals:

The present device is intended to be carried by a farm tractor of well known type which is equipped to support, raise and lower various types of farm implements, the tractor and its supporting and raising means, while varying in detail from others, being substantially typical of a number of such tractors.

The tractor, a portion only of which is shown, includes an elongated box-like frame 11 which extends substantially from its rear to its front end, and toward its forward end supports an upstanding engine housing 12. A typical seat 12A, steering wheel 12B and post 12C are also shown.

The tractor is equipped on each of its opposite sides with duplicate mechanisms which each include pull bars 13 and 15 which extend laterally outward from the frame 12 and support brackets 17, 19. Arms 21 are pivotally hinged at their forward ends by pins 22 in the brackets 17 and extend rearwardly therefrom. The brackets 17 also journal a transverse rocker bar 23 to which are rigidly secured rearwardly extending arms 25, from which supporting links 27 depend to the arms 21. The rocker bar 23 also carries a rigidly secured upwardly extending arm 29 which is coupled through a pin 30 to a shift rod 31 which extends rearwardly above and along the frame 11 of the tractor, and through a coupling 32, is engaged with a rock arm 33. The arm 33 is secured as by a clamp 33A on a rock arm 34, disposed transversely across the tractor frame and is actuated by mechanism carried by the tractor, which forming no part of the present invention is not shown.

The tractor frame 11 also carries a positioning lever 35 and quadrant 37, and the shift rod 31 carries a stop 39. A rod 41 is coupled by a pin 38 to the lever 35 and extends forwardly therefrom. The lever 35 carries a stop 42 lying in the path of the stop 39 on the shift rod and limits the amount that the rod may be shifted rearwardly, and correspondingly the amount that the parts coupled through the arms 29 and 25 thereto may be lowered.

The brackets 19 support a transverse rocker bar 43, to which are rigidly secured rearwardly extending arms 45, and an upwardly extending arm 47 which is coupled by a pin 48 to the rod 31 for concurrent shift with the arm 29.

Chopping

The present chopping devices are likewise shown in duplicate, but are independent in action. Each comprises (Fig. 3) a rectangular frame 51, which carries bearings 52 journalling vertically disposed shafts 53. The shafts 53 depend below the bearings and at their lower ends carry discs 55 which may be plain or notched as will be later described, and which, whether plain or notched, are preferably in sectors 55B which are secured as by screws to a flange or hub 55A through which shaft attachment is effected. The shafts 53 carry at their upper ends pinions 57 which mesh with oppositely faced pinions 59 and 60 on a cross shaft 61, and are turned by these pinions in opposite directions. Shaft 61 carries a sprocket pinion 63 and is driven through a sprocket chain 65 by a sprocket 67 mounted on a counter shaft 68. The shaft 68 is driven by a sprocket 69 through a sprocket chain 71 from a sprocket wheel 73 on the rear axle 74 of the tractor for coordinated movement with the wheels 75 of the tractor. The shaft 68 is journalled in suitable bearings which may be bearings 76 carried by a bracket 76A rigidly secured to the underside of the box frame 11, as by screws 76B.

Figure 5:
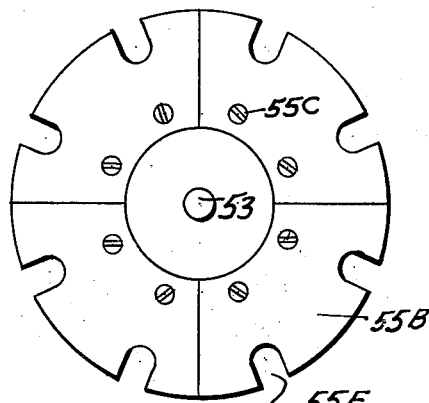
Figure 6:
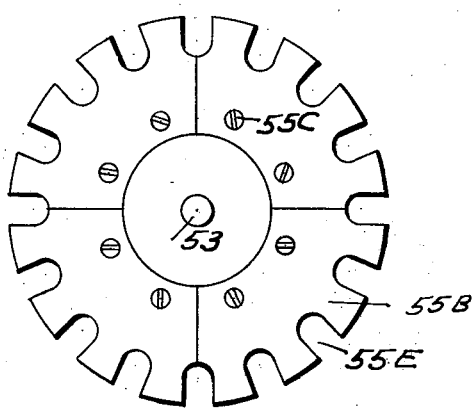

Discs for final chopping have a limited number of edge notches 55D which are spaced, as in Fig. 4, to effect the desired plant spacing. For initial chopping and thinning of the plants along the row, disc sectors are selected and installed which have a much greater number of edge notches 55E, as in Fig. 6. For a second thinning, disc sectors are installed having a lesser number of notches 55F, as in Fig. 5. Preferably the number of notches in the final discs are doubled in the intermediate discs, and redoubled in the initial discs.

The arms 21 lie against opposite sides of the frame 51, and the frame is rigidly secured to the arm by clamps 77, and is raised or lowered by the link 27 when the arms 25 and 29 are shifted by the rod 31. Plow shanks 81, which carry plow shares 83, are adjustably secured to the arms 21 by clamps 79 and provide means for adjusting the plow shares, relatively to the discs 55.

Harvesting

For harvesting, the notched discs are replaced by the smooth edge discs, shown in Fig. 4 and carrier mechanism is added which removes the products severed or dislodged by the discs rearwardly and upwardly. This mechanism comprises duplicate guide structures, each including lower guide members 85, 85A, and parallel upper guide members 87, 87A which are spaced from the lower members to form guideways for fingers 89 projecting laterally from the links of chain belts 91. The guide members are substantially horizontal at their forward ends and rearwardly thereof, curve upward to a greater height from the ground. Adjacent their forward and rear ends, the four guide members 85, 85A; 87, 87A are rigidly connected by U-shaped forks 93, 95, the fork 95 being substantially identical with the fork 93 shown in Fig. 3.

Secured to the forward forks 93 are vertically extending supporting legs 93A, 93B, integrally connected at their upper ends and connected through a cross member 97 to the duplicate guide structure.

The legs 93A of the forward guide structure are connected by pins 98, adjustable along the slots 93B in the legs, to brackets 99 which are carried by the arms 21 for concurrent raising with the raising of the disc frame. The rear forks 95 are connected by legs 95A through pins 100 to links 101, and these links through pins 102 to the arms 45 for concurrent raising by such arms.

The forward ends of the chain belts 91 pass around and are driven by sprockets 102 mounted on the shafts 53. The rear ends of the chains pass around idler sprockets 104, carried by shafts 103 suitably journalled in the rear ends of the guide structure. The sprockets 102 are vertically adjustable along the shafts 53 and may be held in adjusted position by set screws 102A. Preferably the shafts 53 are provided with elongated keyways 53A in which keys 102B in the hubs of the sprockets are slidably mounted.

At their rear ends the chain belts described discharge above and onto a conveyor, shown particularly in Fig. 2 as chain belts 105, the chain belts 105 being of the same type as the belts 91, but with interposed plain links to effect wider finger spacing.

At their forward ends the chain belts 105 pass around sprockets 106, journalled by shafts 107, which shafts are carried by supports 108, secured to and depending from a transverse member 109, secured to the tractor frame 11. At their rear ends the belts 105 pass around sprockets 110 which are carried by shafts 111 suitably journalled in bracket supports 111A carried by beams 116 secured to the tractor frame 11 and extending oppositely outward therefrom. The shafts 111 are driven by a cross shaft 117 through bevel pinions 118 and 118A respectively mounted on the shafts 111 and 117. The shaft 117 preferably carries a pulley 119 and is driven by a pulley 21 on the tractor axle 74 through a belt 123.

*Harvesting operation*

In harvesting, where plants are to be harvested at substantial height above the top of the row, as in the recovery of the top of the plants for seed, the sprockets 102 and adjacent parts are positioned substantially as shown in Fig. 3, and secured by tightening the set screws 102A, and the smooth edge harvesting disc sectors 55B installed. The frames 51 and 93 are raised to lift the discs 55 to the height above the row at which it is desired to cut off the plants. The tractor is then driven along the rows and the plants cut off by the discs, these plants being engaged above the discs by co-action of the fingers 89 of the carrier chains and shifted rearwardly as the machine progresses forward until they are released at the back of the carrier frame and dropped onto the belts 105, by which they are further raised and delivered.

Where the plants are to be cut off at row level, the relative positioning of the sprockets 102 and the disc 55 may be maintained unless the plants have definite heads, such as lettuce and cabbage have, in which case the sprockets are dropped as close to the discs as the construction will permit. The tractor is driven along the rows with the discs substantially at row level and the plants cut off at such level, the fingers of the carrier in such case substantially underlying the heads of cabbage or lettuce cut off and removing these heads rearwardly, dropping them onto the carrier 105, as before.

In both these operations the plows 83 are either raised to clear the plants or are entirely removed.

Where onions or other bulbous plants are to be harvested, the plows 83 are installed and lowered with their bottoms substantially level with or slightly below the discs 55, and the sprockets 99 are positioned above the discs at a height substantially above the top of the plant bulbs. The tractor is then driven along the rows with the plows and discs lowered to cut below the bottom of the bulbs. The plows throw the dirt outward in front of the discs leaving the bulbs carried by an arrow ridge of dirt. The discs 55 undermine this ridge, break up the dirt below the bulbs and dislodge the bulbs. The fingers 89 of the carrier belt embrace and clamp the tops of the plants between them, and thus held, the suspended bulbs are shifted rearwardly until the end of the carrier is reached, and the fingers 89 swinging apart release the plants and allow the bulbs to drop on the underlying belts 105 by which they are carried rearwardly and upwardly for disposal.

I claim:

1. A tractor carried harvester which includes a frame, shafts vertically disposed in parallel and journalled in said frame, with major portions of the lengths of said shafts projecting below said frame, frame carried means for coordinating rotation of said shafts, shearing discs mounted on the lower ends of said shafts in shearing contact the one with the other, and driving sprockets mounted on and adjustable along said shafts below said frame and driven by said shafts, tractor carried means for driving said shafts, and tractor carried means for raising and lowering said frame; a carrier disposed rearwardly of said frame, said carrier including duplicate structures extending rearward respectively from said shafts, each said structure including inner and outer members in pairs spaced vertically apart to establish guide slots, front and rear forks respectively joining and bracing said members and leg structures respectively connecting said front and said rear forks, idler sprockets journalled by the rear ends of said structures, chain belts each respectively carried by a said idler and a said driving sprocket, said chain belts having fingers projecting in guided relation through said slots, the fingers of the proximate flights of said chains projecting into intermeshing relation to establish a carrier belt, means forming part of said leg structure for adjusting the forward end of said carrier in conformity with adjustment of said driving sprockets and tractor carried means for raising and lowering said carrier in coordination with the raising and lowering of said frame.

2. A tractor carried harvester which includes a frame, shafts vertically disposed in parallel and journalled in said frame, with major portions of the lengths of said shafts projecting below said frame, frame carried means for coordinating rotation of said shafts shearing discs mounted on the lower ends of said shafts in shearing contact the one with the other, and driving sprockets mounted on and adjustable along said shafts below said frame and driven by said shafts, tractor carried means for driving said shafts, and tractor carried means for raising and lowering said frame; a carrier disposed rearwardly of said frame, said carrier including duplicate structures extending horizontally rearward from said shafts, and curving arcuately upward, each said structure including inner and outer members in pairs spaced vertically apart to establish arcuately curved guide slots, front and rear forks respectively joining and bracing said members, and leg structure respectively connecting said rear forks and said structures, idler sprockets journalled at the rear ends of said structures, chain belts each respectively carried by said idler and a said driving sprocket, said chain belts having fingers projecting in guided relation through said slots, the fingers of the proximate flights of said chains projecting into intermeshing relation to establish a carrier belt.

3. A tractor carried harvester which includes a frame, shafts vertically disposed in parallel and journalled in said frame, with major portions of the lengths of said shafts projecting below said frame, frame carried means for coordinating rotation of said shafts shearing discs mounted on the lower ends of said shafts in shearing contact the one with the other, and driving sprockets mounted on and adjustable along said shafts below said frame and driven by said shafts, tractor carried means for driving said shafts and tractor carried means for raising and lowering said frame; a carrier structure including duplicate slotted guides having idler sprockets journalled by their rear ends, said guides extending horizontally rearward from said frame, and curving arcuately upward, tractor carried means for supporting and raising and lowering said guides concurrently with raising and lowering of said frame, and means for adjusting the forward ends of said guides relatively to said frame to conform with adjustment of said driving sprockets; chain belts, each carried by a said driving and a said idler sprocket, said chain belts having fingers projecting horizontally in guided relation through the slots of said guides, the fingers of the proximate flights of said chains projecting into intermeshing relation to establish a carrier belt for said structure.

4. A tractor carried harvester which includes vertically off-barring plows, a frame rearward of said plows, shafts vertically disposed in parallel and journalled in said frame, with major portions of the lengths of said shafts projecting below said frame, shearing discs mounted on the lower ends of said shafts in shearing contact the one with the other, and driving sprockets mounted on and driven by said shafts, tractor carried means for driving said shafts, and tractor carried means for raising and lowering said frame and said plows; a carrier structure including guides having idler sprockets journalled at their rear ends, said guides being disposed rearwardly of said frame, tractor carried means for supporting and raising and lowering said guides concurrently with raising and lowering of said frame, chain belts, each carried by a said driving and a said idler sprocket, said chain belts having fingers projecting horizontally in guided relation through said guides, the fingers of the proximate flights of said chains projecting into intermeshing relation to establish a carrier belt for said structure.

JACKSON W. ROBERTS.

REFERENCES CITED

The following references are of record in the file of this patent:

UNITED STATES PATENTS

| Number | Name | Date |
| --- | --- | --- |
| 464,179 | McCaul | Dec. 1, 1891 |
| 1,648,313 | Luce | Nov. 8, 1927 |
| 1,928,868 | Poen | Oct. 3, 1933 |
| 1,938,347 | Munger | Dec. 5, 1933 |
| 2,314,681 | Beatty | Mar. 23, 1943 |
| 2,327,204 | McLemore | Aug. 17, 1943 |
| 2,393,122 | Schwindt et al. | Jan. 15, 1946 |